US008631736B2

(12) United States Patent
Kortas et al.

(10) Patent No.: US 8,631,736 B2

(45) Date of Patent: Jan. 21, 2014

(54) TWO-PART PISTON FOR AN INTERNAL COMBUSTION ENGINE

(75) Inventors: Jochen Kortas, Murr (DE); Christof Geissler, Freudenstadt (DE)

(73) Assignee: MAHLE International GmbH, Stuttgart (DE)

(*) Notice: Subject to any disclaimer, the term of this patent is extended or adjusted under 35 U.S.C. 154(b) by 883 days.

(21) Appl. No.: 12/312,742

(22) PCT Filed: Oct. 23, 2007

(86) PCT No.: PCT/DE2007/001886

§ 371 (c)(1), (2), (4) Date: Jun. 22, 2010

(87) PCT Pub. No.: WO2008/061486

PCT Pub. Date: May 29, 2008

(65) Prior Publication Data

US 2011/0041684 A1 Feb. 24, 2011

(30) Foreign Application Priority Data

Nov. 23, 2006 (DE) ........................ 10 2006 055 251

(51) Int. Cl.
*F16J 1/00* (2006.01)

(52) U.S. Cl.
USPC ................................ 92/223; 92/220; 92/255

(58) Field of Classification Search
USPC ........................... 92/186, 216, 220, 223, 255
See application file for complete search history.

(56) References Cited

U.S. PATENT DOCUMENTS

| | | | | |
|---|---|---|---|---|
| 4,356,800 | A | 11/1982 | Moebus | |
| 4,532,686 | A * | 8/1985 | Berchem | 92/220 |
| 5,029,562 | A | 7/1991 | Kamo | |
| 6,401,680 | B1 * | 6/2002 | Zhu et al. | 92/220 |
| 2008/0060514 | A1 | 3/2008 | Scharp | |

FOREIGN PATENT DOCUMENTS

| | | |
|---|---|---|
| CH | 543 000 | 10/1973 |
| DE | 2 046 862 | 3/1972 |
| DE | 36 33 134 | 4/1988 |

(Continued)

OTHER PUBLICATIONS

German Search Report dated Nov. 5, 2007 in German Patent Application No. 10 2006 055 251.2 with English translation of relevant parts.

(Continued)

*Primary Examiner* — Michael Leslie

(74) *Attorney, Agent, or Firm* — Collard & Roe, P.C.

(57) ABSTRACT

The invention relates to a two-part piston (1) for an internal combustion engine, consisting of an upper part (2) and a lower part (3) which is screwed to the upper part. The upper part (2) and the lower part (3) are in contact with each other, partially by means of inner bearing surfaces (25, 26) defining the lower side of an upper ring rib (10) and the upper side of a lower ring rib (11), and partially by means of outer bearing surfaces (28, 29) defining the lower side of the ring wall (9) and the upper side of a collar (27) applied to the lower part (29). In order to avoid frictional rubbing, frictional heat sealing and pressure-related material heat sealing, at least one of the bearing surfaces (25, 26, 28, 29) is easily and economically provided with a chrome layer (30) which has a structured surface comprising a plurality of raised parts and recesses.

7 Claims, 3 Drawing Sheets

(56) References Cited

FOREIGN PATENT DOCUMENTS

| | | |
|---|---|---|
| DE | 40 29 315 | 3/1992 |
| DE | 44 29 489 | 2/1996 |
| DE | 198 33 825 | 12/1999 |
| DE | 10 2004 030 218 | 1/2006 |
| DE | 10 2006 015 587 | 10/2007 |
| EP | 0 007 661 A1 | 2/1980 |
| EP | 0 007 661 B1 | 2/1980 |
| WO | WO 2005/121537 | 12/2005 |

OTHER PUBLICATIONS

International Search Report of PCT/DE2007/001886, Apr. 9, 2008.

* cited by examiner

TWO-PART PISTON FOR AN INTERNAL COMBUSTION ENGINE

CROSS REFERENCE TO RELATED APPLICATIONS

This application is the National Stage of PCT/DE2007/001886 filed on Oct. 23, 2007, which claims priority under 35 U.S.C. §119 of German Application No. 10 2006 055 251.2 filed on Nov. 23, 2006. The international application under PCT article 21(2) was not published in English.

The invention relates to a two-part piston for an internal combustion engine, in accordance with the preamble of claim 1.

An upper part of a composite piston is known from the German patent application having the file number 10 2006 015 587.4, which part has a ring rib on its underside, facing away from the piston crown, having an inner contact surface, and a ring wall having an outer contact surface. In order to avoid vibration friction wear and welding of the contact surfaces of the two piston parts, and thus wear of the contact surfaces, after assembly of the upper piston part and the lower piston part, during engine operation, groove-shaped depressions are worked into the contact surfaces of the upper part. The depressions are produced by means of lathing or by means of a laser, which brings the disadvantage with it that production of the depressions is relatively complicated and expensive.

It is the task of the invention to avoid this disadvantage of the state of the art. This task is accomplished with the characteristics that stand in the characterizing part of the main claim. Practical embodiments of the invention are the object of the dependent claims.

Figure 1:
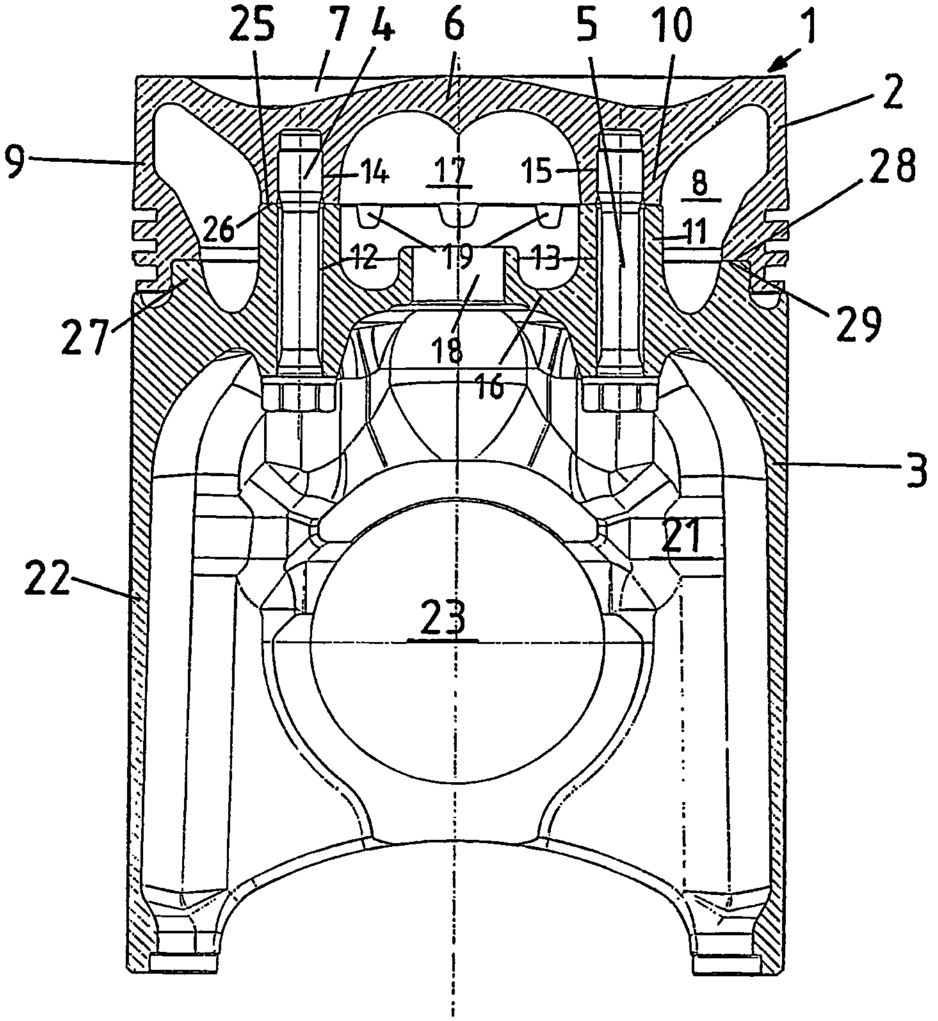
Figure 2:
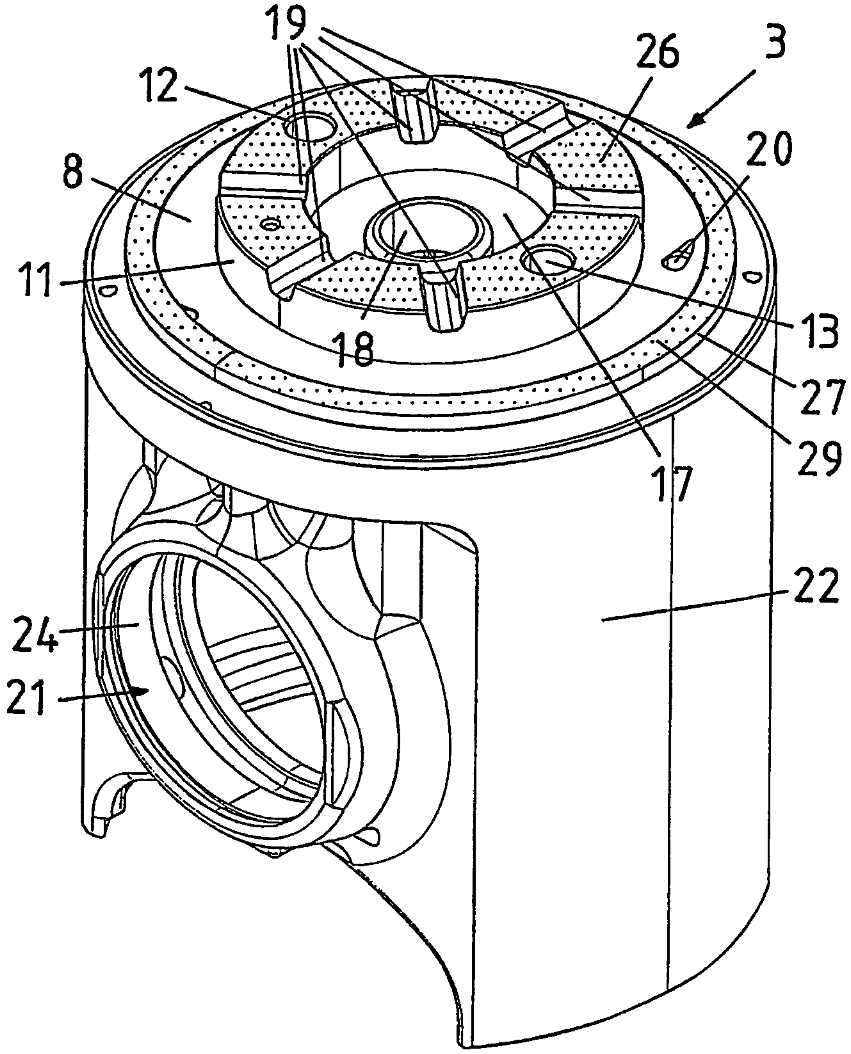
Figure 3:
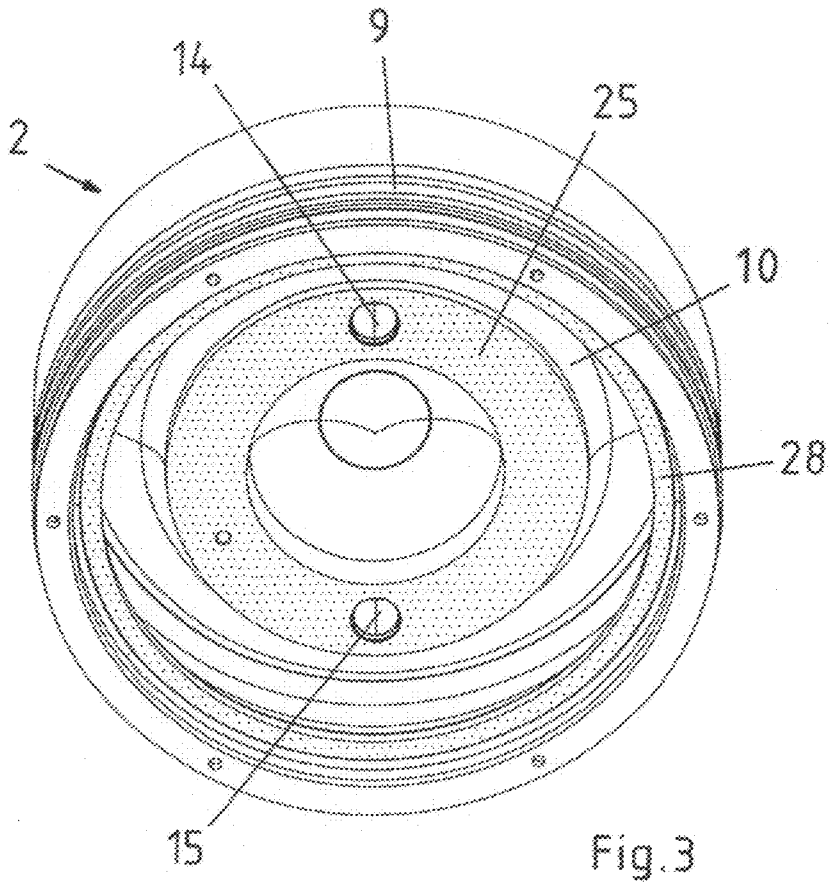
Figure 4:
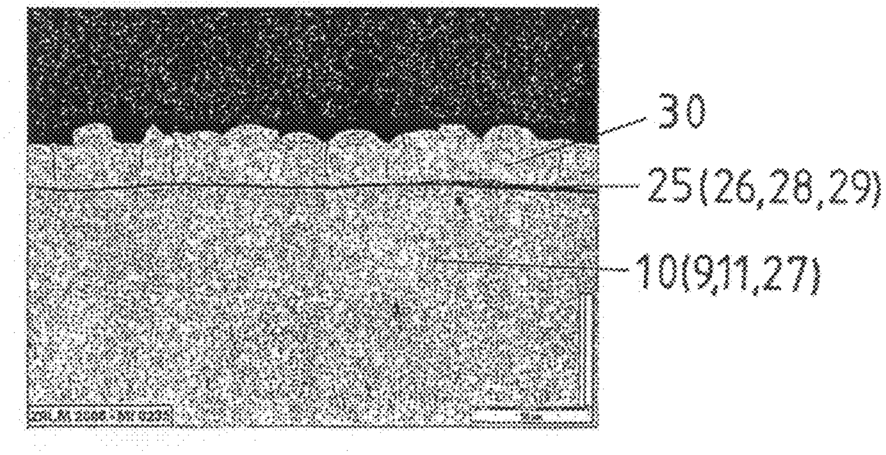

Some exemplary embodiments of the invention will be described in the following, using the drawings. These show:

FIG. 1 a sectional diagram of a piston consisting of an upper part and a lower part, which two piston parts are screwed to one another by means of expansion screws, FIG. 2 a perspective representation of the lower part of the piston and the supporting surfaces, by way of which the upper part of the piston rests on its lower part, FIG. 3 a perspective representation of the upper part of the piston and of the supporting surfaces, and FIG. 4 a cross-section of the supporting surface having a chrome layer.

FIG. 1 shows a piston 1 for an internal combustion engine, which consists of an upper part 2 and a lower part 3. In this connection, the upper part 2 can consist of steel, and the lower part 3 can consist of cast nodular graphite or of aluminum, or the upper part 2 and the lower part 3 of the piston 1 can consist of steel.

The upper part 2 and the lower part 3 are screwed to one another by means of two expansion screws 4 and 5. The upper part 2 forms the piston crown 6, in which a combustion bowl 7 is disposed. Close to the piston crown 6, the piston 1 has a circumferential cooling channel 8 radially on the outside, which is formed partly into the upper part 2 and partly into the lower part 3 of the piston 2. The cooling channel 8 is delimited radially on the outside by a ring wall 9 connected with the piston crown 6, and radially on the inside partly by the piston crown 6, partly by a circumferential upper ring rib 10 formed onto the underside of the upper part 2, facing away from the piston crown, and partly by a lower ring rib 11 affixed to the side of the lower part 3 that faces the piston crown. For the two expansion screws 4 and 5, two bores 12 and 13 are made in the lower ring rib 11, and two dead-end bores 14 and 15 having an inside thread are made in the upper ring rib 10.

An inner cooling chamber 17 is delimited by the piston crown 6, by the upper and the lower ring rib 10 and 11, and by the upper ceiling region 16 of the lower part 3, which chamber has a lower opening 18 by way of which cooling oil is sprayed into the inner cooling chamber 17. By way of channels 19, which are radially disposed and easy to see in FIG. 2, the cooling oil gets from the cooling chamber 17 into the cooling channel 8, which has an oil drain opening 20, shown in FIG. 2, by way of which the cooling oil is guided into the piston interior 21. The lower part 3 of the piston 1 furthermore has a piston skirt 22 and two pin bores 23 and 24, which are shown in FIGS. 1 and 2.

As shown in FIGS. 1 to 3, the upper ring rib 10, on its underside, and the lower ring rib 11, on its upper side, each have an inner, ring-shaped supporting surface 25, 26, by way of which the radially inner regions of the upper part 2 and of the lower part 3 of the piston 1 lie on top of one another. Radially on the outside, the face side of the ring wall 9, facing away from the piston crown, and a collar 27 affixed to the upper side of the lower part 3, each have an outer, ring-shaped supporting surface 28 and 29, by way of which the radially outer regions of the upper part 2 and of the lower part 2 lie on top of one another. In this connection, the distance of the inner supporting surfaces 25, 26 from the piston crown 6 is less than the distance of the outer supporting surfaces 28, 29 from the piston crown 6.

According to the invention, it is provided to cover either the inner and outer supporting surface 25 and 28 of the upper part 2, or the inner and outer supporting surface 26 and 29 of the lower part 3, or all the supporting surfaces 25, 26, 28, and 29 of the upper part 2 and of the lower part 3 of the piston 1 with a chrome layer 30, as shown in FIG. 4, a section through the supporting surfaces having the chrome layer 30, having a structured surface and a thickness between 15 μm and 40 μm. In this connection, it is also possible to coat only the inner supporting surface 25 of the upper part 2 and/or the inner supporting surface 26 of the lower part 3.

In this connection, the surface of the chrome layer 30 has the form of buds or nubs. The roughness Rz of the chrome layer 30 amounts to between 10 μm and 25 μm. The surface-structured chrome layer 30 can be applied using an electrochemical (galvanic) method, whereby seed formation processes of the chrome are triggered on the supporting surfaces, by means of electrical voltage pulses, and subsequently, growth of the chrome seeds is brought about by accumulation of additional chrome, by means of additional successor pulses.

The supporting surfaces 25, 26, 28, 29 of the composite piston 1 consisting of the upper part 2 and the lower part 3 move relative to one another during engine operation, so that as a result, vibration friction wear occurs at the supporting surfaces, and friction welding of the supporting surfaces also occurs. Furthermore, because of the great pressure that the upper part 2 exerts on the lower part 3 of the piston 1 during the combustion process, material welding of parts of the supporting surfaces can occur, with partial material releases attributable to this. The surface-structured chrome layer 30 according to the invention has the advantage that the oil holding volume of the structured surface of the chrome layer 30 is improved, thereby avoiding the vibration friction wear and friction welding of the supporting surfaces that move relative to one another. Furthermore, the structuring of the surface of the chrome layer 30 reduces the pressure-related partial material welding of and damage to the supporting surfaces.

Furthermore, the chrome layer 30 is harder and therefore more wear-resistant than the basic piston material, so that the chrome layer has a lower friction wear during engine operation than the basic piston material without a chrome layer, according to the state of the art.

REFERENCE SYMBOL LIST

1 piston
2 upper part of the piston 1
3 lower part of the piston 1
4, 5 expansion screw
6 piston crown
7 combustion bowl
8 cooling channel
9 ring wall
10 upper ring rib
11 lower ring rib
12, 13 bore
14, 15 dead-end bore
16 ceiling region of the lower part of the piston 1
17 inner cooling chamber
18 lower opening of the inner cooling chamber
19 channel
20 oil drain opening
21 piston interior
22 piston skirt
23, 24 pin bore
25 inner supporting surface of the upper part
26 inner supporting surface of the lower part
27 collar
28 outer supporting surface of the upper part
29 outer supporting surface of the lower part
30 chrome layer

The invention claimed is:

1. Two-part piston (1) for an internal combustion engine, consisting of an upper part (2), and a lower part (3) screwed onto the upper piston part, having a piston crown (6) formed by the upper part (2), and a piston skirt (22) formed by the lower part (3), which skirt has two pin bores (23, 24) that lie opposite one another, having a circumferential cooling channel (8) disposed radially on the outside, close to the piston crown (6), which is formed partly into the upper part (2) and partly into the lower part (3), which is delimited, radially on the outside, by a ring wall (9) connected with the piston crown (6), and a circumferential collar (27) affixed to the upper side of the lower part (3), and which is delimited, radially on the inside, partly by a circumferential upper ring rib (10) formed onto the underside of the upper part (2), facing away from the piston crown, and partly by a circumferential lower ring rib (11), affixed to the upper side of the lower part (3), on the side facing the piston crown, whereby the upper part (2) and the lower part (3) stand in contact with one another, partly by way of inner supporting surfaces (25, 26) that delimit the underside of the upper ring rib (10) and the upper side of the lower ring rib (11), and partly by way of outer supporting surfaces (28, 29) that delimit the underside of the ring wall (9) and the upper side of the collar (27), wherein at least one of the supporting surfaces (25, 26, 28, 29) is covered with a chrome layer (30) that has a structured surface, having a plurality of elevations and depressions, and wherein the chrome layer is formed by application of an electrochemical method which triggers seed formation processes of the chrome on said at least one of the supporting surfaces by means of electrical voltage pulses, so that the structured surface has buds or nubs.

2. Piston (1) according to claim 1, wherein at least one of the inner supporting surfaces (25, 26) is covered with the chrome layer (30).

3. Piston (1) according to claim 1, wherein the inner and the outer supporting surface (25, 28) of the upper part (2) of the piston (1) are covered with the chrome layer (30).

4. Piston (1) according to claim 1, wherein the inner and the outer supporting surface (26, 29) of the lower part (3) of the piston (1) are covered with the chrome layer (30).

5. Piston (1) according to claim 1, wherein the inner and the outer supporting surfaces (25, 26, 28, 29) of the upper part (2) and of the lower part (3) of the piston (1) are covered with the chrome layer (30).

6. Piston (1) according to one claim 1, wherein the chrome layer (30) has a thickness between 15 μm and 40 μm.

7. Piston (1) according to claim 1, wherein the chrome layer (30) has a roughness $R_z$ between 10 μm and 25 μm.

* * * * *

UNITED STATES PATENT AND TRADEMARK OFFICE

CERTIFICATE OF CORRECTION

PATENT NO. : 8,631,736 B2
APPLICATION NO. : 12/312742
DATED : January 21, 2014
INVENTOR(S) : Kortas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1276 days.

Signed and Sealed this
Twenty-second Day of September, 2015

Michelle K. Lee
*Director of the United States Patent and Trademark Office*